United States Patent [19]

Thomas, Jr.

[11] Patent Number: 5,317,307
[45] Date of Patent: May 31, 1994

[54] METHOD FOR PULSE WIDTH MODULATION OF LEDS WITH POWER DEMAND LOAD LEVELING

[75] Inventor: Laurence C. Thomas, Jr., Portland, Oreg.

[73] Assignee: Intel Corporation, Santa Clara, Calif.

[21] Appl. No.: 887,777

[22] Filed: May 22, 1992

[51] Int. Cl.⁵ .............................................. G08B 5/22
[52] U.S. Cl. .................................. 340/815.45; 345/44; 345/211
[58] Field of Search ........... 340/761, 762, 811, 815.03, 340/815.11, 815.12, 815.19

[56] References Cited

U.S. PATENT DOCUMENTS

| | | | |
|---|---|---|---|
| 4,190,836 | 2/1980 | Kimura et al. | 340/811 |
| 4,727,367 | 2/1988 | Noda | 340/811 |
| 4,842,520 | 6/1989 | Dupont | 340/815.12 |
| 4,967,192 | 10/1990 | Hirane et al. | 340/811 |
| 5,068,652 | 11/1991 | Kobayashi | 340/815.03 |
| 5,159,328 | 10/1992 | Albrecht | 340/815.03 |

Primary Examiner—Alvin E. Oberley
Assistant Examiner—Gin Goon
Attorney, Agent, or Firm—Nicholas J. Skarlatos

[57] ABSTRACT

The present invention discloses a method and an apparatus for power demand load leveling of a power supply driving a plurality of LED's through the use of pulse width modulation. A first modulating signal provided from a pulse width modulator is applied to a delay means for generating second, third and fourth modulating signals each delayed from the previous modulating signal by a predetermined time. The modulating signals are used to modulate control signals corresponding to four groups of associated LED's in order to permit only one group of LED's to be turned on at any one time, although more than twenty five percent of the LED's may be active at any one time. Each of the first, second, third and fourth modulating signals are applied to a different group of four groups of activation switches along with their respective control signals to enable the switches and activate an associated group of LED's. The predetermined time, representing a time delay between each of the modulating signals, is chosen to correspond to twenty five percent of the period of the first modulating signal. Due to the time delay between the inputs of the different modulating signals, only one group of LED's will change state from off to on at any one time even though each group of LED's may be activated during a period and more than twenty five percent of the LED's may be active at any one time.

8 Claims, 3 Drawing Sheets

METHOD FOR PULSE WIDTH MODULATION OF LEDS WITH POWER DEMAND LOAD LEVELING

BACKGROUND OF THE INVENTION

(1) Field of the Invention

The present invention relates to the field of power demand load leveling, particularly in the field of pulse width modulation of LED's for controlling the intensity of the LED's without overloading the power supply.

(2) Prior Art

On the front of many supercomputers, panels are provided with an array of LED's for indicating the processes which the computer is performing at any one time. To light the LED's in the array, control lines from different processing sections of the computer are carried via a system bus to the LED panel and are connected to the LED's through transistor switches used for enabling the LED's. When a specific control line in the system bus is sent high, the respective transistor switch is enabled so as to turn on the and activate the LED associated with that control line.

To control the intensity of the LED's within the array, pulse width modulation of the control signals transmitted by the control lines has been used to produce a series of rapid activations of the enabled LED's. This is performed by providing a modulating signal having a series of pulses as input to the gating control logic. The gating control logic enables their respective LED's when the gating control logic simultaneously receive a high input from the control lines and a high input from the modulating signal. The input from the modulating signal consists of a series of digital pulses having high and low states, with at least one change of state occurring within each period of the modulating signal. The width of a given pulse in the period of the modulating signal determines the length of time that the enabled LED's will be activated during the period. The period is in the order of microseconds so that the series of activations of the LED's produce an appearance that the LED's are being dimmed rather than being turned on and off.

The gating control logic for each LED in the array receives the same modulating signal so that each enabled LED is turned on and off at the same time and at the same rate as the other enabled LED's as determined by the pulse within the period of the modulating signal. The rapid succession of activations produced by the modulating signal thereby causes each of the enabled LED's to have the same intensity output. For a small number of LED's in the array, this type of pulse width modulation switching presents no problem for the power source since the current demand on the power supply is usually in the order of several amps.

However, for larger arrays of LED's, the total amount of current required to activate all of the LED's can be in the order of 50 to 100 amps. Because the conventional method of pulse width modulation switching of LED's activates all enabled LED's at once upon the rising edge of a pulse in the modulating signal, an enormous current demand is produced when a significant percentage of the LED's is enabled. Each time this occurs, the sudden change in current demand may overload the power supply and trigger the power supply over current detection which shuts down the power supply. In addition, the power supply may have severe difficulty in maintaining a regulated voltage during these high current switching transitions. When the power supply responds to a sudden change in the current demand the output voltage will change in the inverse direction of the current demand, especially with switching power supplies.

Accordingly, it is an object of the present invention to provide a method and apparatus for pulse width modulation of LED's that reduces the magnitude of the instantaneous change in the current demand on the power supply such that a more stable output voltage can be maintained.

It is another object of the present invention to provide a method and apparatus for pulse width modulation of an array of LED's in which only twenty five percent of the maximum current demand is switched at any one time.

SUMMARY OF THE INVENTION

The present invention discloses a method and an apparatus for power demand load leveling of a power supply driving a plurality of LED's through the use of pulse width modulation. A first modulating signal provided from a pulse width modulator is applied to a delay means for generating second, third and fourth modulating signals, each delayed from the previous modulating signal by a predetermined time. The delayed modulating signals are generated from the output of a twelve bit shift register in which its fourth, eighth and twelfth cells are tapped to output the second, third and fourth modulating signals, respectively.

The modulating signals are then used to modulate control signals corresponding to four groups of associated LED's in order to permit only twenty five percent of the maximum current demand to be switched at any one time. Each of the first, second, third and fourth modulating signals are applied to a different sets of activation switches along with respective control signals to enable the switches and activate an associated group of LED's. Each activation switch is comprised of gating control logic for driving a transistor having a drain connected to ground and a source connected via an associated LED to a power supply. Each gating control logic receives as input one of the modulating signals and a corresponding control signal for enabling the gating control logic when both inputs are high. When the gating control logic is enabled, it turns the associated transistor on and activates the associated LED.

The predetermined time, representing a time delay between each of the modulating signals, is chosen to correspond to twenty five percent of the period of the first modulating signal. In this respect, each of the modulating signals will generate a high input to its corresponding set of activation switches during each period so that each associated group of LED's will be enabled within every period of the first modulating signal. Due to the time delay between the generation of the different modulating signals, only twenty five percent of the maximum current demand will be switched at any one time from the perspective of the power supply.

BRIEF DESCRIPTION OF THE DRAWINGS

The objects, features and advantages of the present invention will become apparent from the following detailed description of the preferred embodiment in which.

DETAILED DESCRIPTION OF THE INVENTION

Figure 1:
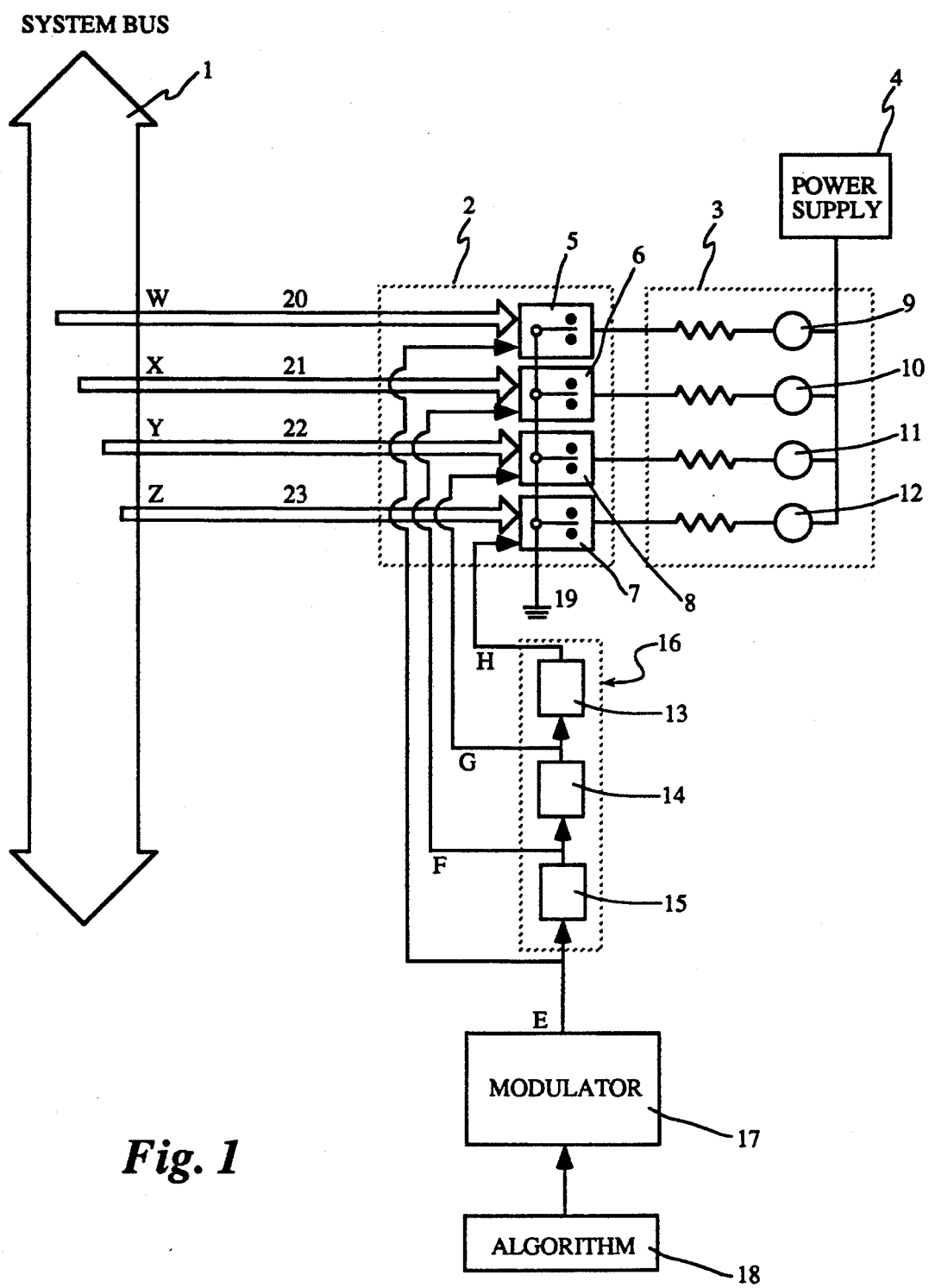
FIG. 1 is a block diagram of the present invention showing groups of LED's having their control signals modulated with the modulating signals output from the delay means.

With reference to FIG. 1, a method and device for power demand load leveling of a power supply (4) driving a plurality of LED's (9-12) through the use of pulse width modulation is described. In the following description, numerous specific details are set forth such as circuit elements, device types, etc., in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

Figure 2:
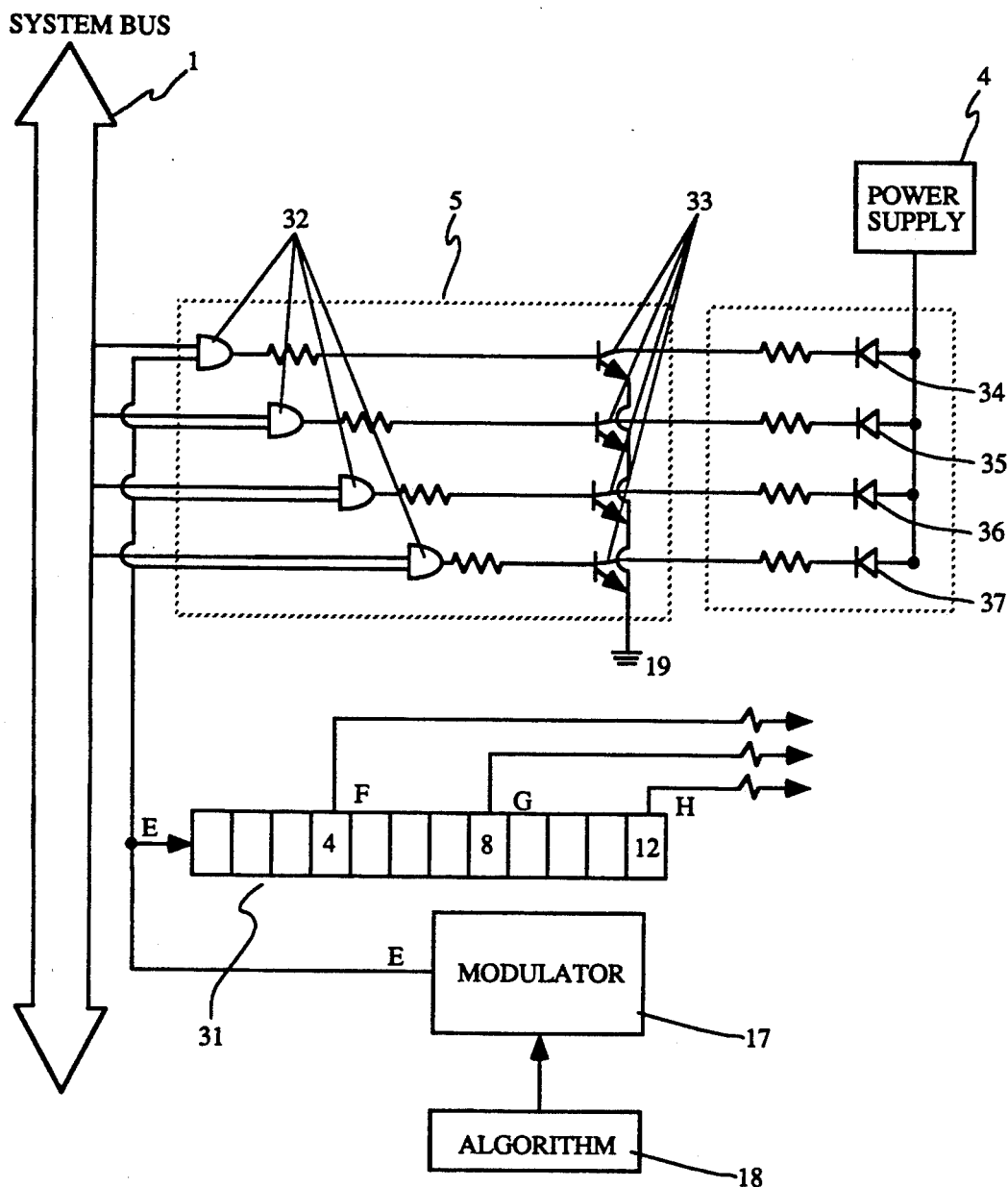
FIG. 2 is a partial circuit diagram of the present invention showing one group of four LED's with their respective control lines and control devices.

In the present invention shown in FIG. 1, a system bus (1) is used to carry a plurality of control lines (20-23) from the processing sections of the computer to a front panel having the LED's (9-12) arranged thereon in an array. A plurality of control signals (X,W,Y,Z) having either a high or low state are generated by the processing sections and are transmitted by the control lines (20-23) to the LED's (9-12) through respective sets of activation switches (5-8). With reference to FIG. 2, one set of activation switches (5) is comprised of gating control logic (32) forming AND gates and transistors (33) for activating one group of LED's (9). The transistors have a base terminal coupled to a respective AND gate, a collector terminal coupled in series to a power supply via a respective LED element and an emitter terminal coupled to ground. When the gating control logic (32) is enabled by receiving a high control signal, they generate output to their respective transistors (33) for driving the transistors (33) on and off. Once turned on, the transistors (33) provide current from the power supply (4) for activating the associated LED's (34-37) in the group of LED's (9).

A pulse width modulator (17) is provided for generating a modulating signal having digital pulses. The precise wave form of the modulating signal output from the modulator may be determined by the use of an algorithm (18) implemented in either software or hardware as is well-known in the art. When a modulating signal is supplied along with a control signal to the gating control logic (32), the logic (32) generates either a high control signal or a low control signal as output to its respective transistor (33). A high control signal for turning the transistor (33) on is output from logic (32) when a high control signal from the processing section is received by the logic (32) along with a high pulse from a modulating signal. A low control signal for turning the transistor (33) off is output from the logic (32) when logic (32) receives either a low control signal from the processing section or a low pulse of a modulating signal.

With reference to FIG. 1, in order to reduce the current demand on the power supply (4), the present invention supplies a first modulating signal E to a delay means (16), to generate a predetermined number of delayed modulating signals (F, G, H). In the operation of present invention, the delay means (16) may take the form of either a predetermined number of delay elements (13-15) with each outputting a different delayed modulating signal or, referring to FIG. 2, a shift register (31) having taps as will be described below. Referring to FIG. 1, in the case of a predetermined number of delay elements (13-15), the first modulating signal (E) is fed to a first delay element (13) having as output a second modulating signal (F) delayed from the first modulating signal (E) by a predetermined time which is fed to a second delay element (14) to generate a third modulating signal (G) delayed by twice the predetermined time and so on. In this manner, each of the delayed modulating signals (F, G, H) are shifted in time by the predetermined time with respect to the previous modulating signal.

In the preferred embodiment of the present invention, as shown in FIG. 2 for only one group of LED's (9) with a corresponding set of switches (5), a twelve bit shift register (31) is used to generate the delayed modulating signals (F, G, H) by sequentially storing twelve binary values corresponding to the pulses or lack of pulses in the first modulating signal (E). The second, third and fourth modulating signals (F, G, H) are then generated by tapping the values stored within the fourth, eighth and twelfth cells of the shift register (31) as the values are sequentially shifted through the twelve cells of the shift register (31). However, as will be obvious to one skilled in the art, other well-known circuit elements and time delay means may be used to produce the second, third and fourth modulating signals each delayed by an additional predetermined time.

Figure 3:
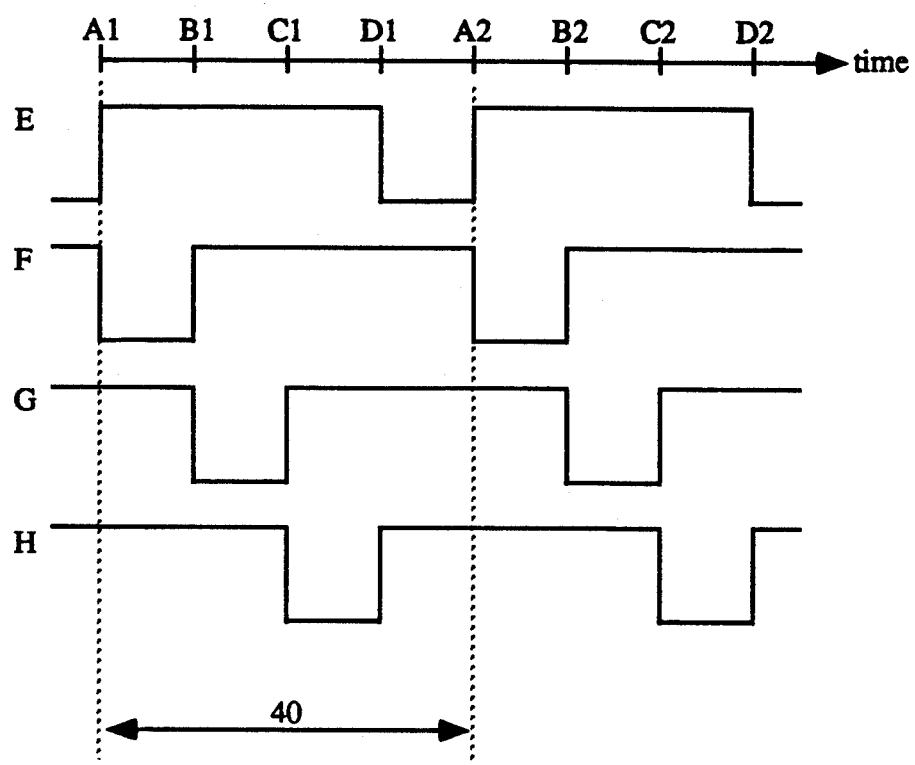
FIG. 3 is a timing diagram showing the digital pulses of the first, second, third and fourth modulating signals in reference to the period of the first modulating signal.

In determining the time delay between a predetermined number of modulating signals (E,F,G,H), the predetermined time is chosen with respect to the duration of the positive pulses in the first modulating signal (E), as shown in FIG. 3, so that the input of each modulating signal (E,F,G,H) to its respective set of switches (5-8) goes high during each period (40). This will permit each set of a predetermined number of sets of switches (2) to be turned on at least once during each period (40), however, no two sets of switches will be turned on at exactly the same time. This can be accomplished by equally dividing the period (40) by the predetermined number of modulating signals (E,F,G,H), although it will be obvious to one skilled in the art that other time delays will achieve the same result.

Hence, in the preferred embodiment, four modulating signals (E,F,G,H) are utilized having a predetermined time corresponding to one fourth of the period (40) of the first modulating signal (E). As shown in FIG. 3, the first modulating signal (E) has a period (40) spanning from time A1 to time A2. In this regard, the predetermined time is denoted by the time periods A1-B1, B1-C1, C1-D1, etc. Thus, the first, second, third and fourth modulating signals (E, F, G, H) each have the rising edge of a positive pulse occurring within the period (40) of the first modulating signal (E) at the times A1, B1, C1 and D1, respectively. Although the rising edge of the positive pulses within the modulating signals (E,F,G,H) are fixed to occur at the designated times, the falling edge can occur at any subsequent time. In other words, if a particular modulating signal goes high within the period (40), it can stay high for either a fraction of or for the entirety of the period (40).

The predetermined number of modulating signals (E, F, G, H) are then applied to the predetermined number of sets of switches (2), shown in FIG. 1, in order to modulate the control signals (W,X,Y,Z) corresponding to the predetermined number of groups of LED's (3). Each group of control lines (20, 21, 22, 23) is connected to its respective group of LED's (9, 10, 11, 12) through a set of activation switches (5, 6, 7, 8) in which the individual switches are turned on and off according to the input of the respective control signal and modulating signal as described above. Once a switch is turned on, it supplies power to its respective LED to activate that LED.

In the preferred embodiment of the present invention, each group of LED's (9-12) consists of twenty five percent of the total LED's in the array. Because the modulating signals (E, F, G, H) vary in phase with respect to each other, each set of activation switches (5-8) is sequentially turned on by their respective modulating signals (E, F, G, H) so that no more than one group of LED's, comprising twenty five percent of the total LED's, is activated (or switched on) at any one time. That is, no more than twenty five percent of the total LED's will change their state from off to on at a given time, although more than twenty five percent of the total LED's may be lit at one time. As will be obvious to one skilled in the art, the number of delays applied to the first modulating signal (E), and hence, the number of modulating signals (E, F, G, H), sets of activation switches (5-8) and groups of LED's (9-12) used in the present invention may be varied so as to activate a different number of LED's at any one time. Similarly, it would also be obvious to vary the predetermined time and/or the period (40) of the first modulating signal (E) to activate the groups of LED's (9-12) at different times or to produce different delays between the activations.

While the invention has been described in conjunction with the preferred embodiment, it is evident that numerous alternatives, depictions, variations and uses will be apparent to those skilled in the art in light of the foregoing description. Specifically, many different circuits, sub-circuits and elements therein may be used so as to obtain the corresponding relationships described in the methods and apparatus herein claimed.

I claim:

1. A method for pulse width modulation switching of LED's to produce power demand load leveling of a power source for said LED's, said method comprising the steps of:

arranging said LED's into a predetermined number of groups;

supplying control signals via control lines to a predetermined number of gating control logic elements corresponding to said groups of LED's for controlling activation of said LED's, each of said gating control logic elements comprising a plurality of AND gates each having as a first input said control signal of a respective control line and an output coupled in series to an individual LED via a transistor, said transistor having a base terminal coupled to said AND gate, a collector terminal coupled in series to a power supply via a respective LED and an emitter terminal coupled to ground;

providing a first modulating signal having a preset period as output from a pulse width modulator, said modulator being driven by a waveform algorithm capable of varying said period of said first modulating signal;

generating a predetermined number of delayed modulating signals from said first signal; and supplying said first signal and said delayed signals as a second input to said AND gates of separate gating control logic elements, respectively, to modulate said control signals of said groups of LED's with a different signal to activate no more than one of said groups of LED's at any one time within said period of said first modulating signal.

2. The method of claim 1, wherein said step of generating a predetermined number of delayed modulating signals is performed by applying said first modulating signal to a shift register and selecting said delayed modulating signals as output from preselected cells of said shift register, said selection of said delayed modulating signals as output from preselected cells of said shift register corresponding to a time of activation of respective groups of LED's such that said time of activation of said respective groups of LED'is selectively variable within said period of said first modulating signal.

3. The method of claim 2, wherein said shift register comprises twelve cells and said predetermined number of delayed modulating signals comprise second, third and fourth modulating signals selected from the output of a fourth, eighth and twelfth cell of said shift register, respectively.

4. The method of claim 3, wherein said second, third and fourth modulating signals are delayed from said first modulating signal by once, twice and three times a predetermined time, respectively, with said predetermined time corresponding to twenty five percent of the period of said first modulating signal.

5. The method of claim 4, wherein said predetermined number of groups of LED's comprises four groups of said LED's with each of said groups having twenty five percent of a total number of said LED's, with control signals of each of said groups of LED's modulated with a different modulating signal of said first, second, third and fourth modulating signals.

6. The method of claim 1, wherein said step of generating a predetermined number of delayed modulating signals is performed by applying said first modulating signal to a first delay element of a predetermined number of serially connected delay elements, with each of said delayed modulating signals output from a respective delay element and delayed from a previous modulating signal by a predetermined time.

7. A method for pulse width modulation switching of LED's to produce power demand load leveling of a power source for said LED's, said method comprising the steps of:

arranging said LED's into a predetermined number of groups;

supplying control signals via control lines to a predetermined number of gating control logic elements corresponding to said groups of LED's for controlling activation of said LED's, each of said gating control logic elements comprising a plurality of AND gates each having as a first input said control signal of a respective control line and an output coupled in series to an individual LED via a transistor, said transistor having a base terminal coupled to said AND gate, a collector terminal coupled in series to a power supply via a respective LED and an emitter terminal coupled to ground;

providing a first modulating signal having a preset period as output from a pulse width modulator, said modulator being driven by a waveform algorithm capable of varying said period of said first modulating signal;

supplying said first modulating signal to a shift register and selecting a predetermined number of delayed modulating signals as output from preselected cells of said shift register, said selection of said delayed modulating signals as output from preselected cells of said shift register corresponding to a time of activation of respective groups of LED's such that said time of activation of said respective groups of LED's is selectively variable within said period of said first modulating signal; and supplying said first signal and said delayed signals as a second input to said AND gates of separate gating control logic elements, respectively, to modulate said control signals of said groups of LED's with a different signal to activate no more than one of said groups of LED's at any one time within said period of said first modulating signal.

8. A method for pulse width modulation switching of groups of LED's in an LED array of a computer to produce power demand load leveling of a power source for said LED's, said LED array comprising first, second, third and fourth groups of LED's, said method comprising the steps of:

supplying control signals via control lines from processing sections of said computer to first, second, third and fourth gating control logic elements corresponding to said groups of LED's, each of said gating control logic elements comprising a plurality of AND gates each having as a first input said control signal of a respective control line and an output coupled in series to an individual LED via a transistor, said transistor having a base terminal coupled to said AND gate, a collector terminal coupled in series to a power supply via a respective LED and an emitter terminal coupled to ground;

providing a first modulating signal having a preset period as output from a pulse width modulator, said modulator being driven by a waveform algorithm capable of varying said period of said first modulating signal;

supplying said first signal as input to a shift register comprising twelve cells;

selecting as output from a fourth, eighth and twelfth cell of said shift register second, third and fourth signals delayed from said first signal by once, twice and three times a predetermined time, respectively, said predetermined time corresponding to twenty five percent of said period of said first modulating signal;

modulating control signals of said first, second, third and fourth groups of LED's by applying said first, second, third and fourth signals as a second input to said AND gates of said first, second, third and fourth gating control logic elements, respectively, to activate no more than one of said groups of LED's at any one time, said period of said first modulating signal being selected such that said predetermined time is sufficiently long to permit an output current of said power supply to stabilize between consecutive activations.

* * * * *